June 16, 1931.                R. T. KINGSFORD ET AL                1,810,355
                                RADIO TUNING INDICATOR
                             Filed June 6, 1930        2 Sheets-Sheet 1
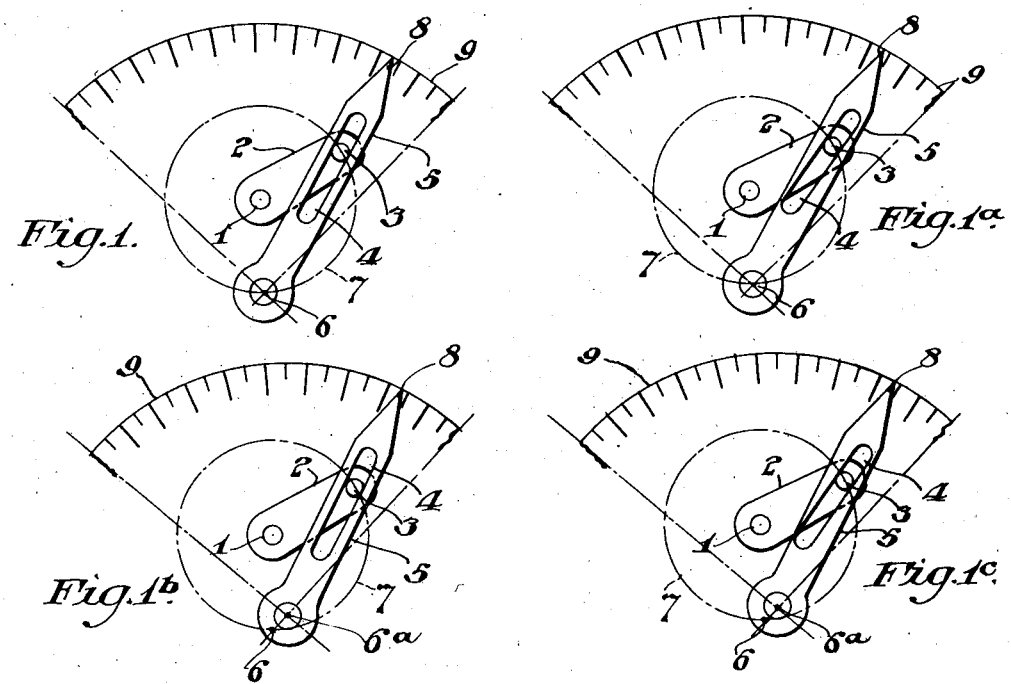
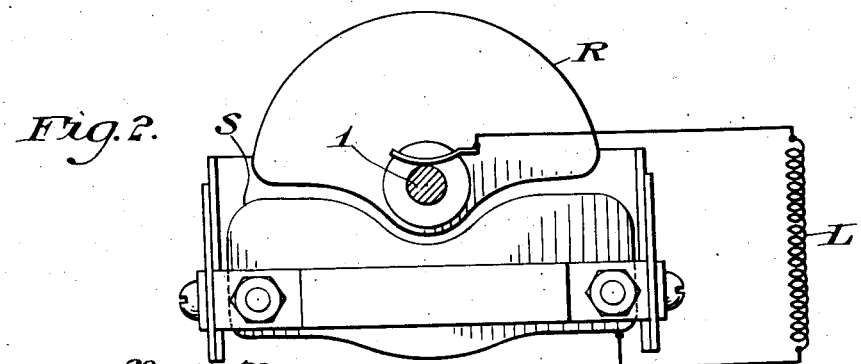
Inventors
Russell T. Kingsford
and Lewis H. Davis
By
their Attorney June 16, 1931.      R. T. KINGSFORD ET AL      1,810,355
RADIO TUNING INDICATOR
Filed June 6, 1930      2 Sheets-Sheet 2

Patented June 16, 1931

1,810,355

UNITED STATES PATENT OFFICE

RUSSELL T. KINGSFORD, OF WYNCOTE, AND LEWIS H. DAVIS, OF UPPER DARBY, PENNSYLVANIA, ASSIGNORS TO ATWATER KENT MANUFACTURING COMPANY, OF PHILADELPHIA, PENNSYLVANIA, A CORPORATION OF PENNSYLVANIA

RADIO TUNING INDICATOR

Application filed June 6, 1930. Serial No. 459,528.

Our invention relates to apparatus for tuning circuits, particularly those of radio receiving apparatus, in which the adjustable element or rotor of a tuning device, such as a condenser or inductance, has cooperatively related thereto one of the other of the elements of a pointer and scale combination.

In accordance with our invention, there intervenes between the rotor or adjustable element of the tuning device and the movable element of a pointer and scale combination a structure, having generally the functions or characteristics of a cam, for producing a movement of the movable element of the pointer and scale combination, the angular extent of which is either greater than or, and preferably, less than that of the rotor or adjustable element of the tuning device.

Further in accordance with our invention, the structure intervening between the rotor or adjustable element of the tuning device and the movable element of the pointer and scale combination is of a character to effect a compensation or rectification whereby the law of the relative movements of those elements is not a linear function, or their movements are not directly proportional to each other; and more particularly, the compensating or rectifying mechanism may comprise structure in nature of a cam, which may at the same time effect the aforesaid unequal movements of the rotor or adjustable element of the tuning device and of the movable element of the pointer and scale combination.

Further in accordance with our invention, structure of the character aforesaid, intervening between the rotor or adjustable element of the tuning device and movable element of the pointer and scale combination, is of a character that notwithstanding relatively small dimensions, the radius of curvature of the scale is relatively great.

More particularly in accordance with our invention, the cam and its follower or actuator are both pivoted, one of them partaking of angular movements equal or proportional to the angular adjustment of the rotor or adjustable element of the tuning device, and the other partaking of angular movements equal or proportional to the relative movement of the elements of the scale and pointer combination; more particularly, the cam element is pivoted on an axis which lies on a circle described by its follower or actuator; and more particularly, the pivotal axis of the cam may be offset with respect to the aforesaid circle, and/or with respect to a line passing through the axis of rotation of the follower or actuator and substantially the mid-point of the relative movement of scale and pointer.

Further in accordance with our invention, the cam follower or actuator may be carried upon a member secured to the rotor or adjustable element of the tuning device, and the cam element pivoted concentrically with a rotatable, manually operated element which effects adjustment of said rotor or adjustable element by coaction with the member carrying the cam follower or actuator.

Our invention relates to tuning apparatus of the character hereinafter described and claimed.

For an understanding of our invention, and for an illustration of some of the various forms our structure may take, reference is to be had to the accompanying drawings, in which:

Fig. 1 is an elementary illustration of apparatus embodying our invention;

Figs. 1a, 1b and 1c are elementary illustrations of modifications of the structure shown in Fig. 1;

Fig. 2 illustrates a variable tuning condenser and its associated inductance;

Fig. 5 is a fragmentary elevational view of a modification.

Figure 3:
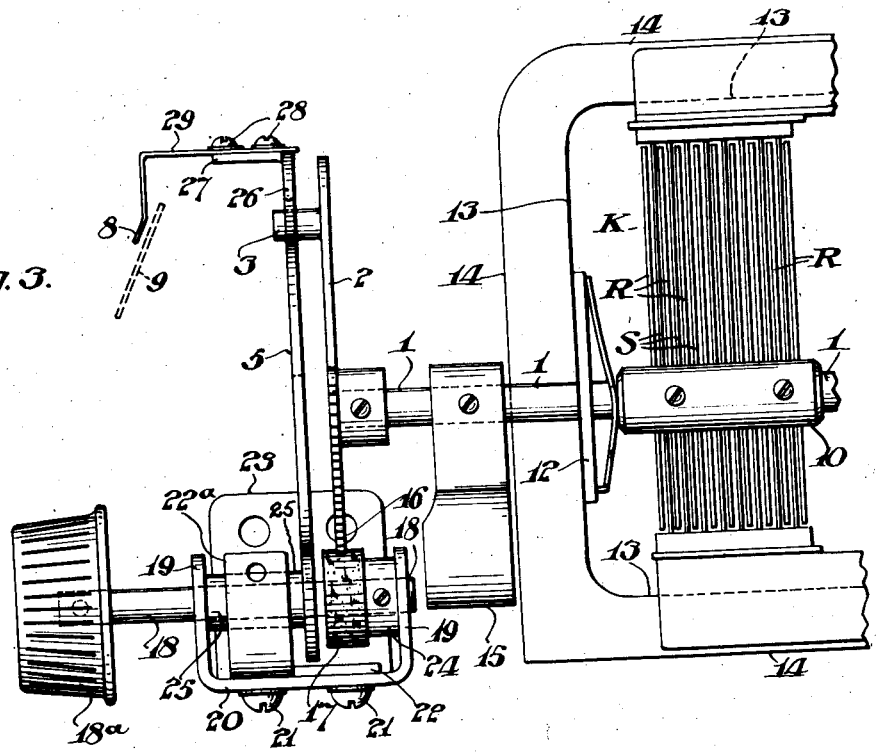
Fig. 3 is a plan view of a preferred embodiment of our invention.

Referring to Fig. 1, upon the shaft 1 of the rotor or adjustable element of a tuning device, such as a variable capacity or a variable inductance, is secured a member 2 upon which is mounted or secured the cam actuator or follower 3, in the form of a pin, roller or equivalent. The member 3 is disposed in the slot 4, radial from the center 6 and whose sides or walls are in effect or constitute cam surfaces of the cam member or element 5 pivoted at 6 upon the circle 7, an arc of which is described by the follower or member 3. The cam member 5 carries the indicator or pointer 8, coacting with the scale 9, having suitable scale divisions either uniformly or non-uniformly spaced according to circumstances. In the example illustrated, and, generally, the divisions or markings of the scale 9 are uniformly spaced.

With the arrangement shown, assuming a total angular movement of the rotor or adjustable element of the tuning device to be 180 degrees, the movement of the pointer 8 and the arcuate length of the scale 9 is one-half, or 90 degrees.

For example, the shaft 1 may be that of the rotor plates R, Fig. 2, of a variable condenser whose stator plates are indicated at S. The condenser is in circuit with an inductance L of variable, or, and preferably, as indicated, fixed magnitude. The inductance L may be that of any circuit, as of a radio receiving system, to be tuned by variation of the capacity of the condenser whose plates are respectively R and S. The inductance L may be, and often is, an autotransformer or the secondary of a transformer, particularly such as may be utilized in coupling an antenna to the input circuit of a vacuum tube of the audion type, or, and generally, for coupling the output circuit of one vacuum tube to the input of another. In this example, the rotor and stator plates R and S are so shaped that the condenser is of the so-called straight line capacity type, in which equal increments of rotation of the rotor plates R effect equal increments in change of capacity of the condenser.

Ordinarily, a total adjustment of the rotor plates R from minimum to maximum capacity of the condenser is 180 degrees, and by a structure, such as shown in Fig. 1, the extent of movement of the movable element of the pointer and scale combination is then 90 degrees.

When the condenser has a straight line capacity characteristic, and its associated inductance L is of fixed magnitude, the markings of the scale 9, either in wave lengths or in frequency or kilocycles, will not be uniformly spaced, but will be more closely spaced in the region of minimum capacity of the condenser, and progressively increase in spacing to the other end of the scale 9.

Where, however, it is desirable that the markings of the scale 9 shall be uniformly spaced, for indicating wave lengths of frequencies, and when the condenser has a straight line capacity characteristic, the slot 4, as defined by its cam surface sides or walls, is suitably varied from the simple form of Fig. 1 to effect a compensation, whereby the scale markings will be uniform as indicated in Fig. 1a, though the change in capacity, and, therefore, rotative movement of the rotor plates R, will be unequal for equal changes in frequency or wave length. Generically to indicate this compensating effect in Fig. 1a, the slot 4 is shown non-radial from the point 6, it being understood, as will be later described in connection with Figs. 3 and 4, the cam surfaces may, or will in fact, be curved.

In Figs. 1b and 1c the pivotal axis of the cam member or arm 5 is offset to the point 6a, from the aforesaid circle 7 in which the follower 3 moves, and also laterally from the point 6, yielding more than 90 degrees travel for the pointer 8 for 180 degrees travel of the rotor and arm 2, and at the same time spreading the graduations at one end of the scale relative to the graduations of the other end. These effects are procured by the arrangement in Fig. 1b, notwithstanding the cam slot 4 is radial to the point 6a; that slot, however, may be non-radial or curved as generically indicated by the non-radial slot 4 in Fig. 1c, the latter imparting a still further modification of movements of the pointer 8 disproportionate to the movements of the rotor or arm 2.

It shall be understood, with respect to Figs. 1 to 1c and Figs. 3 and 4, that when the variable tuning device is a condenser, it may have other than straight line capacity characteristic, and may have straight line frequency, straight line wave length, or a composite characteristic, and the cam system in any case may effect a movement of the pointer either proportionate or disproportionate to the rotor movement.

Figure 4:
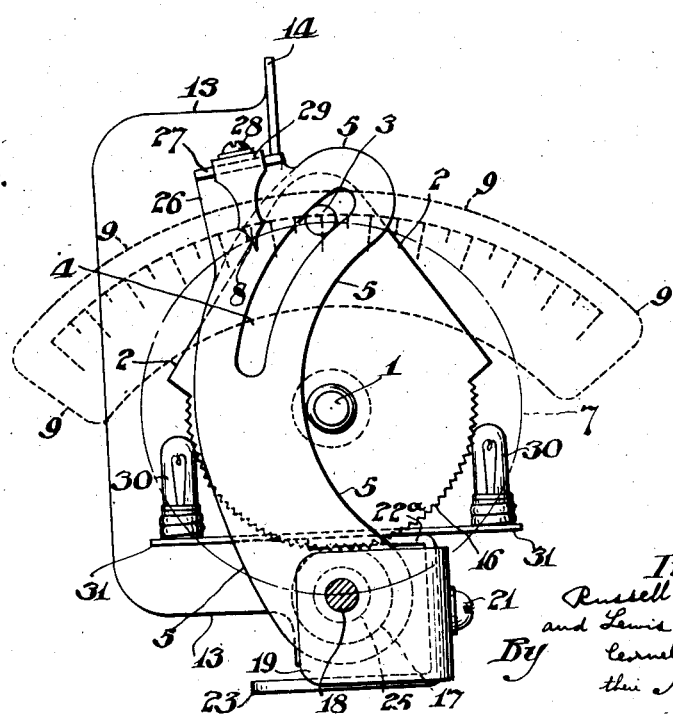
Fig. 4 is an end elevational view of the structure shown in Fig. 3.

Referring to Figs. 3 and 4, there is illustrated a structure embodying the principles of any of the Figs. 1 to 1c inculsive. The rotor shaft 1 is that of any variable tuning device, as an inductance or capacity, but in the example illustrated is the shaft of a gang condenser of which one variable condenser K only is illustrated. This condenser comprises rotor plates R interleaving with stator plates S, the condenser having any suitable characteristic, as straight line capacity, straight line frequency, straight line wave length, or a composite characteristic.

In the example illustrated, the rotor plates are suitably mounted on a tubular sleeve 10 secured by set screws 11 upon the shaft 1, which has a bearing in the plate 12, carried by the metallic cradle or housing 13 having the outwardly turned flanges 14 upon opposite of which are suitably secured the stator plates, suitably insulated, while the rotor plates of all the condenser units are electrically connected together through the shaft, through which they may also be grounded, as well understood. Upon the shaft 1 may be secured a counterweight 15 for counterbalancing the rotors of the several condenser units. Upon the shaft 1 is secured the member or plate 2 having the circular or arcuate lower portion 16 roughened or serrated, as by the teeth indicated, with which engages the rubber or other wheel or roller 17 secured upon the shaft 18, provided with operating knob 18a. The shaft 18 has bearings in the members 19, 19 of the bracket member 20, secured by screws 21 to the upstanding member 22 of a right angle bracket whose bottom plate 23 is secured to any suitable support to which, either directly or indirectly, may be secured the housing 13.

Upon the shaft 18 is secured the collar 24, on a hub of which is carried the aforesaid roller 17. Between the hub of the collar 24 and the left hand member 19, Fig. 3, is disposed a cylindrical collar or sleeve 25, loosely mounted upon the shaft 18, and having secured thereto the cam member or arm 5, which and associated parts are for clarity displaced 90 degrees in Fig. 3 from the positions in Fig. 4.

Upon the plate or member 2 is secured the cam follower or actuator pin or roller 3, engaging in the cam slot 4 in the member 5, which latter has the bracket 26 having the laterally extending member 27 upon which is secured by the screws 28 the member 29 terminating in the pointer 8, coacting with the scale carried by or graduated on the scale-plate 9, which may be translucent for illumination from the rear thereof by suitable sources of light, such as the small incandescent lamps 30 carried by any suitable structure, as by a bracket or plate 31, which may be mounted upon the element 22a of the bracket member 22. Ordinarily, the pointer 8 and scale 9 are visible through a suitably shaped and positioned aperture of the wall structure of the cabinet or enclosure for the radio receiving set.

In tuning, the operator rotates the knob 18a, thereby rotating the roller 17, plate or member 2 and the shaft 1 of the condenser rotor structure. At the same time the cam follower 3, in the slot 4, actuates the cam arm or member 5, rotating about the axis of the shaft 18, and moving the pointer 8 with respect to the scale 9.

The pivotal axis of the member 5 is upon a circle whose center is the axis of the shaft 1 and whose radius is equal to the radial distance of the member 3 from the axis of the shaft 1. Or, as hereinbefore indicated, the pivotal axis of the member 5 may be offset from such circle and also with respect to any given radius or diameter of that circle, particularly that which bisects the scale arc.

The cam slot 4 is, in this example, curved, and of such form and characteristics that when a condenser unit as K is utilized to tune a circuit whose inductance is of fixed magnitude, the condenser having, for example, non-uniform capacity characteristic, the divisions of the scale, in wave lengths or frequencies, may, nevertheless, be substantially uniformly spaced.

Or in general, the shape of the cam slot 4 may be anything suitable or desirable to effect the movement of the pointer 8 proportionate or non-proportionate to the angular movements of the rotor shaft 1, either when the pivotal axis of the member 5 is at a point such as 6 in Figs. 1 and 1a, or offset therefrom, as generically indicated in Figs. 1b and 1c.

As to Figs. 1b and 1c and Figs. 3 and 4, it shall be understood that the pivotal axis, as 6a of the cam arm or member 5, may be offset to a point outside of the circle 7, and in any case may be also offset to the opposite side of the line from the point 6 to the middle of the scale arc.

While it is indicated in Figs. 1 to 1c and Figs. 3 and 4 that the movable element of the pointer and scale combination is the pointer, it shall be understood, as indicated in Fig. 5, that the pointer 8 may be stationary and that the scale 9 is carried by the cam member or arm 5.

It shall be understood that the cam and its follower or actuator may be relatively reversed, in which case the cam surface or surfaces will be upon or carried by the member 2, and the cam follower or actuator 3 will be carried by the member 5.

For brevity in the appended claims, the term pointer is used in a generic sense to describe the movable element of the scale and pointer combination.

What we claim is:

1. In a tuning system utilizing a rotor of a tuning device and a pointer with its scale, a mechanical movement for determining the relative movements of the rotor and pointer comprising a member movable in fixed relation with respect to the rotor, and a pointer actuating member controlled by said member and pivoted upon a circle substantially in an arc of which said member moves.

2. In a tuning system utilizing a rotor of a tuning device and a pointer with its scale, a mechanical movement for determining the relative movements of the rotor and pointer comprising a member movable in fixed relation with respect to the rotor, a pointer actuating member pivoted excentrically with respect to said rotor and controlled by said member, said pointer fixedly secured to said actuating member, and a member for operating said mechanical movement rotatable about an axis substantially coincident with the pivotal axis of said pointer actuating member.

3. In a tuning system utilizing a rotor of a tuning device and a pointed with its scale, a mechanical movement for determining the relative movements of the rotor and pointer comprising a member movable in fixed relation with respect to the rotor, a pointer actuating member controlled by said member and pivoted upon a circle substantially in an arc of which said member moves, and a member for operating said mechanical movement rotatable about an axis substantially coincident with the pivotal axis of said pointer actuating member.

4. In a tuning system utilizing a rotor of a turning device and a pointer with its scale, a mechanical movement for determining the relative movements of the rotor and pointer comprising cam structure having coacting cam and follower elements intervening between the rotor and the pointer, and means for pivoting said pointer, one of said cam structure elements moving in fixed relation with respect to said rotor, said pointer fixedly secured to the other of said elements, said mechanical movement effecting an arcuate movement of said pointer materially less than the arcuate movement of said rotor.

5. In a tuning system utilizing a rotor of a tuning device and a pointer with its scale, a mechanical movement for determining the relative movements of the rotor and pointer comprising cam structure having coacting cam and follower elements intervening between the rotor and the pointer, means for pivoting said pointer, one of said cam structure elements moving in fixed relation with respect to said rotor, said pointer fixedly secured to the other of said elements, said mechanical movement effecting an arcuate movement of said pointer materially less than the arcuate movement of said rotor, and a member for operating said mechanical movement rotatable about an axis substantially coincident with the pivotal axis of said pointer.

6. In a tuning system utilizing a rotor of a tuning device and a pointer with its uniformly divided scale, a mechanical movement for determining the relative movements of the rotor and pointer comprising cam structure having coacting cam and follower elements intervening between the rotor and the pointer, and means for pivoting said pointer, one of said cam structure elements moving in fixed relation with respect to said rotor, said pointer fixedly secured to the other of said elements, said mechanical movement effecting an arcuate movement of said pointer materially less than and disproportionate to the arcuate movement of said rotor.

7. In a tuning system uilizing a rotor of a tuning device and a pointer with its uniformly divided scale, a mechanical movement for determining the relative movements of the rotor and pointer comprising cam structure having coacting cam and follower elements intervening between the rotor and the pointer, and means for pivoting said pointer, one of said cam structure elements moving in fixed relation with respect to said rotor, said pointer fixedly secured to the other of said elements, said mechanical movement effecting an arcuate movement of said pointer approximately one-half of and disproportionate to the arcuate movement of said rotor.

8. In a tuning system utilizing a rotor of a tuning device and a pointer with its uniformly divided scale, a mechanical movement for determining the relative movements of the rotor and pointer comprising cam structure having coacting cam and follower elements intervening between the rotor, and the pointer, means for pivoting said pointer, one of said cam structure elements moving in fixed relation with respect to said rotor, said pointer fixedly secured to the other of said elements, said mechanical movement effecting an arcuate movement of said pointer materially less than and disproportionate to the arcuate movement of said rotor, and a member for operating said mechanical movement rotatable about an axis substantially coincident with the pivotal axis of said pointer.

9. In a tuning system utilizing a rotor of a tuning device and a pointer with its scale, a mechanical movement for determining the relative movements of the rotor and pointer comprising a pivoted sheet metal member having the pointer fixedly secured thereto and having an opening whose contour constitutes a cam, said pointer and its pivot disposed on opposite sides of the axis of said rotor, a cam follower secured to said rotor and disposed within said opening and engaging said cam, said mechanical movement effecting an arcuate movement of said pointer materially less than the arcuate movement of said rotor.

10. In a tuning system utilizing a rotor of a tuning device and a pointer with its uniformly divided scale, a mechanical movement for determining the relative movements of the rotor and pointer comprising a pivoted sheet metal member having an opening whose contour constitutes a cam, the pointer carried in fixed position on said member, a cam follower secured to said rotor and disposed within said opening and engaging said cam, said mechanical movement effecting an arcuate movement of said pointer materially less than and disproportionate to the arcuate movement of said rotor.

11. In a tuning system utilizing a rotor of a tuning device and a pointer with its uniformly divided scale, a mechanical movement for determining the relative movements of the rotor and pointer comprising a sheet metal member pivoted excentrically with respect to said rotor and having an opening whose contour constitutes a cam, said member carrying said pointer, a cam follower secured to said rotor and disposed within said opening and engaging said cam, said mechanical movement effecting an arcuate movement of said pointer materially less than and disproportionate to the arcuate movement of said rotor, and a member rotatable about an axis substantially coincident with the pivotal axis of said sheet metal member for rotating said rotor and for rotating said pointer through said mechanical movement.

12. In a tuning system utilizing a rotor of a tuning device and a pointer with its uniformly divided scale, a mechanical movement for determining the relative movements of the rotor and pointer comprising a member having a cam surface and pivoted on one side of the axis of the rotor and carrying said pointer on the opposite side of the axis of said rotor for all positions of said rotor and pointer, a follower engaging said cam surface and secured to said rotor, said mechanical movement effecting an arcuate movement of said pointer materially less than and disproportionte to the arcuate movement of said rotor.

13. In a tuning system utilizing a rotor of a tuning device and a pointer with its uniformly divided scale, a mechanical movement for determining the relative movements of the rotor and pointer comprising a pivoted member, the pointer carried in fixed position on said member remote from its pivotal axis, said member having between its said pivotal axis and said pointer an opening whose contour constitutes a cam, a cam follower secured to said rotor and disposed within said opening and engaging said cam, said mechanical movement effecting an arcuate movement of said pointer materially less than and disproportionate to the arcuate movement of said rotor.

14. In a tuning system utilizing a rotor of a tuning device and a pointer with its uniformly divided scale, a mechanical movement for determining the relative movements of the rotor and pointer comprising a pivoted member, the pointer carried in fixed position on said member remote from its pivotal axis, said member having between its said pivotal axis and said pointer an opening whose contour constitutes a cam, a cam follower secured to said rotor and disposed within said opening and engaging said cam, said rotor having a range of movement of substantially 180 degrees, said mechanical movement effecting an arcuate movement of said pointer approximately one-half of and disproportionate to the arcuate movement of said rotor, and a member rotatable about an axis substantially coincident with the pivotal axis of said first-named member, said last-named member having a rotatable movement materially greater than that of said rotor for driving said rotor and actuating said pointer through said mechanical movement.

15. In a tuning system utilizing a rotor of a variable tuning condenser and a pointer with its scale, a mechanical movement for determining the relative movements of the rotor and pointer comprising a sheet metal member pivoted to one side of the axis of the rotor, the pointer fixedly secured to said member on the opposite side of the axis of said rotor, said member having an elongated slot, a pin secured to said rotor and disposed in said slot for coaction with said member while said pin is on the opposite side of the rotor axis from the pivotal axis of said member, and a member rotatable about an axis substantially coincident with the pivotal axis of said sheet metal member for rotating said rotor through substantially 180 degrees and for rotating said pointer through said mechanical movement approximately one-half the movement of said rotor.

RUSSELL T. KINGSFORD.
LEWIS H. DAVIS.